United States Patent Office 3,503,895
Patented Mar. 31, 1970

3,503,895
READILY DISPERSIBLE, WATER-SOLUBLE GUM COMPOSITIONS CONTAINING DIOCTYL SODIUM SULFOSUCCINATE AND PREPARATION THEREOF
Kenneth Whelan, Suffern, N.Y., assignor to American Cyanamid Company, Stamford, Conn., a corporation of Maine
No Drawing. Continuation-in-part of application Ser. No. 416,135, Dec. 4, 1964. This application Dec. 13, 1967, Ser. No. 690,066
Int. Cl. C08b 29/36
U.S. Cl. 252—363.5     13 Claims

ABSTRACT OF THE DISCLOSURE

Readily dispersible, water-soluble gum compositions in finely divided form are provided containing from 0.001 to 1.0% by weight dioctyl sodium sulfosuccinate. Exemplary of these gum compositions is a mixture of finely divided hydroxypropyl methylcellulose and 0.4% dioctyl sodium sulfosuccinate, based on the weight of the cellulose. The gum compositions are prepared by adding to the gum a solvent solution containing the desired amount of dioctyl sodium sulfosuccinate and then drying off the solvent prior to dissolution of the gum composition in an aqueous medium. The gum compositions are useful as viscosity building agents, particularly in foodstuffs.

SPECIFICATION

This application is a continuation-in-part of my copending application, Ser. No. 416,135, filed Dec. 4, 1964, now abandoned.

This invention relates to water-soluble gums. More particularly, it relates to readily dispersible, finely divided, water-soluble gums containing dioctyl sodium sulfosuccinate, and to a process for preparing these gums.

Gums, in general, are a class of high molecular weight polymers having colloidal properties, which in an appropriate medium are capable of producing highly viscous suspensions or solutions at relatively low dry solids content. While the term "gum" can be applied to a wide variety of both hydrophilic and hydrophobic polymeric substances having gummy characteristics, the term is more generally used to denote water-soluble, naturally-occurring vegetable gums and synthetic cellulosic polymers.

These hydrophilic gums are particularly important to the food industry as edible, nontoxic substances that have the ability to impart viscosity to aqueous solutions. These gums, therefore, have found widespread use as thickening agents, stabilizing agents, emulsifying agents, and the like, for foodstuffs.

Water-soluble gums, however, are difficultly soluble and have a slow rate of solution, because the particles of the gums, especially when in finely divided form, tend to agglomerate and form clumps when they are added to water. This problem of agglomerate formation substantially reduces the rate of dispersion of the fine particles, resulting in the slow rate of solution or hydration of the gum.

While increasing the particle size of the gums reduces the tendency of the particles to agglomerate, their rate of dispersion, and hence their rate of hydration, is rapidly diminished because of the increased difficulty of penetrating the larger particles with water. Thus, while more rapid dispersion can be achieved through the use of gums of fine particle size, a severe practical limit has heretofore been imposed on the size of such particles because of their tendency to agglomerate as the particle size is decreased.

In the past, agglomerate formation of finely divided, water-soluble gums has been somewhat reduced by such methods as adding a surface active agent to the water prior to dissolving the gum; slowly sifting the gum into water with rapid stirring; or pre-wetting the gum substance with a nonaqueous, water-soluble fluid. While agglomerate formation has been somewhat reduced by these procedures, thereby permitting a finer particle size to be used with a concurrent increase in the rate of dispersion, these procedures are time-consuming and are limited in effectiveness, and, therefore, have generally proven too costly for widespread commercial acceptance.

It is therefore a primary object of this invention to provide a new and improved, readily dispersible, water-soluble gum composition.

Another object of this invention is to provide a water-soluble gum composition suitable for use in foodstuffs that has an increased rate of dispersion over prior art gum compositions when dissolved in an aqueous medium.

Yet another object of this invention is to provide a readily dispersible and edible, water-soluble gum composition containing an improved surface active agent for the gum.

Still another object of this invention is to provide a finely divided, water-soluble gum composition containing an improved surface active agent which inhibits the tendency of the fine particles of the gum to agglomerate, thereby resulting in an increased rate of dispersion when the gum composition is dissolved in an aqueous medium.

Still a further object of this invention is to provide a readily dispersable and edible, water-soluble gum composition containing a naturally-occurring vegetable gum or synthetic cellulosic polymer and dioctyl sodium sulfosuccinate.

Yet a further object of this invention is to provide an edible, water-soluble gum composition containing nontoxic amounts of an improved surface active agent, which composition is safe for human consumption, is not detrimental to the taste of foodstuffs, and is suitable for use as a viscosity builder for the foodstuffs.

Still a further object of this invention is to provide a process for effecting rapid dissolution of a finely divided, water-soluble gum by adding to the gum, prior to its dissolution in water, a solvent solution of an improved surface active agent.

Still a further object of one embodiment of this invention is to provide a process for effecting rapid dissolution of a finely divided, water-soluble gum by adding to the gum, prior to its dissolution in water, a nonaqueous solvent solution of dioctyl sodium sulfosuccinate and then drying the gum to evaporate off the solvent.

Additional objects and advantages will be set forth in part in the description which follows, and in part will be obvious from the description or may be learned by practice of the invention, the objects and advantages being realized and attained by means of the compositions, processes, and improvements particularly pointed out in the appended claims.

To achieve the foregoing objects, and in accordance with its purpose, this invention, as embodied and broadly described, provides a readily dispersible, water-soluble gum composition containing a finely divided gum selected from the group consisting of naturally-occurring vegetable gums and synthetic cellulosic polymers, and at least 0.001% dioctyl sodium sulfosuccinate, based on the weight of the gum.

The invention further provides a process for effecting rapid dissolution of a finely divided, water-soluble gum selected from the group consisting of naturally-occurring vegetable gums and synthetic cellulosic polymers, which comprises, adding to the gum a solvent solution containing at least 0.001% by weight of dioctyl sodium sulfosuccinate, based on the weight of the gum, and drying off the solvent prior to dissolution of the gum in an aqueous medium.

It is to be understood that both the foregoing general description and the following detailed description are exemplary and explanatory but are not restrictive of the invention.

The water-soluble gums that are useful in the gum compositions of this invention are hydrophilic, naturally-occurring vegetable gums and synthetic cellulosic polymers. Examples of naturally-occurring vegetable gums are plant gums, such as gum arabic, gum ghatti, gum karaya, gum tragacanth and the like; seaweed gums, such as algin and carrageenan gum, and the like; seed gums such as guar gum, locust bean gum, and the like. Exemplary of synthetic cellulosic polymers are hydroxypropyl methylcellulose, hydroxyethylcellulose, methylcellulose, carboxymethylcellulose, and the like. Mixtures of two or more such gums can also be used if desired. Hydroxypropyl methylcellulose and carboxymethylcellulose are preferred gums for use in the gum compositions of this invention.

Aqueous solutions of these gums can be prepared by making a uniform slurry of from about 0.5 to 20% by weight of the gum in water. Normally however the solutions contain from about 0.5 to 5.0% of the gum.

In accordance with this invention, the gum compositions contain, in addition to a water-soluble gum, nontoxic amounts of dioctyl sodium sulfosuccinate as an improved surface active agent for the gum. While surface active agents, in general, are known to reduce the surface tension of a liquid in which a substance is dissolved, thereby permitting greater and more rapid dissolution of the substance, it has been unexpectedly found that dioctyl sodium sulfosuccinate is far superior in this respect to other surface active agents when used in combination with water-soluble gums.

It has been found, for example, that dioctyl sodium sulfosuccinate greatly reduces the tendency of the gum particles, even in finely divided form, to form aggregates in an aqueous medium and this inhibition of agglomerate formation results in the far superior rate of dispersion achieved by the gum compositions of this invention. With this increased rate of dispersion, there is also a concurrent reduction in hydration time for the gum, because hydration or viscosity build-up of the gum does not take place to any significant degree until the particles are substantially dispersed throughout the liquid.

It has also been found that, in some instances, there is an increase in the final viscosity of the aqueous solution using dioctyl sodium sulfosuccinate because this agent permits greater amounts of the gum to be dissolved in the solution.

In accordance with this invention, the increased rate of dispersion of the water-soluble gum, as a consequence to the inhibition of agglomerate formation, can be achieved by adding to the gum at least 0.001% of dioctyl sodium sulfosuccinate, based on the weight of the gum. While the upper limitations of the concentrations of dioctyl sodium sulfosuccinate, which may be incorporated, are dependent on a variety of factors; namely, the rate of dispersion sought to be achieved, and the ultimate use of the gum solution, since the gums find application in both the food and pharmaceutical industries where taste becomes a factor for consideration. The factor of taste relating to concentration becomes important, since many surface active agents possess an inherent bitterness which is readily apparent. The concentration may therefore be generally expressed as being at least 0.001% of dioctyl sodium sulfosuccinate based on the weight of the water-soluble gum.

It has been found that readily dispersible, finely divided, water-soluble gum compositions are best provided using between about 0.1 to 1.0% by weight of dioctyl sodium sulfosuccinate, based on the weight of the gum, with the preferred range of the agent being from about 0.2 to 0.5% by weight of the gum.

Maximum rate of dispersibility of the gum and maximum final viscosities are achieved at this preferred range of dioctyl sodium sulfosuccinate. In some instances, a slight decrease in the rate of dispersion and the final viscosity of the solution occurs when the amount of the agent is increased above about 0.5%. One percent (1.0%) of the agent, based on the weight of the gum, represents about the maximum amount of the agent that should be used, not only because the use of additional amounts of the agent may adversely affect the rate of dispersion and ultimate viscosity achieved by the treated gum, but because the factor of taste becomes important when the amount of dioctyl sodium sulfosuccinate is increased above this level.

The use of finely divided gums is an important attribute of this invention. The inhibition of agglomerate formation resulting from the use of dioctyl sodium sulfosuccinate in a gum composition permits very finely divided gums to be used, thus further enhancing the rate of dispersion and the ultimate rate of hydration of the gum. It has been found, for example, that the dispersion rate of a gum having a particle size as low as 250 mesh is enhanced by the addition of dioctyl sodium sulfosuccinate to the gum. Generally, gums having a fine particle size within the range of from about 100 to 200 mesh are preferred for use in the gum compositions of this invention.

In accordance with this invention, the gum compositions are prepared by adding dioctyl sodium sulfosuccinate to the gum prior to its dissolution in water. Preferably, the agent is added to the gum by the solvent technique in which the dioctyl sodium sulfosuccinate is dissolved in a suitable solvent, such as water; or a nonaqueous solvent, such as perchloroethylene, acetone, ethyl alcohol, or the like. The solvent solution of dioctyl sodium sulfosuccinate is then admixed with the water-soluble gum. After mixing, the mixture is dried to evaporate off the solvent, leaving the desired amount of dioctyl sodium sulfosuccinate intimately dispersed throughout the gum.

Nonaqueous solvents are preferred for use in the preparation of the gum compositions of this invention, because the use of even small amounts of water as the solvent tends to hydrate the gum. Hydration of the gum increases its particle size, which may necessitate regrinding the gum, after the water has been evaporated, before it can be dissolved in an aqueous medium. Perchloroethylene is a preferred nonaqueous solvent for use in the process of this invention.

By adding dioctyl sodium sulfosuccinate to the gum, prior to its dissolution in water, it has been found that agglomerate formation is substantially inhibited, and that the rate of dispersion, therefore, is effectively increased over prior art procedures where the surface active agent is added to the water prior to the addition of the gum. The process of this invention, therefore, generally results in an effective increase in the rate of dispersion of the water-soluble gum as a consequence to the inhibition of agglomerate formation and with regard to water-soluble cellulosic polymers, in particular, it has been found that agglomerate formation is for the most part eliminated.

The most obvious advantages, which are occasioned by the advent of the present invention, are the reduction in time utilized to prepare solutions of the water-soluble gums with the concomitant decrease in costs. In addition, a further reduction in cost is realized as a consequence of a reduction in the loss of gum which must be discarded when the agglomerate formation occurs. The advent of the present invention satisfies a long-standing want, since the problem of agglomerate formation, which has heretofore placed a limit on the fineness of the particle size of the gums and thus its rate of dispersion and ultimate rate of hydration, has been prevalent since the advent of these gums as viscosity builders for foodstuffs.

To illustrate the invention more specifically, reference is made to the following examples. These examples illustrate the preparation of the gum compositions, the increase in their rate of dispersion, the increase in hydration rate, and in some instances the increase in total viscosity achieved by the gum compositions of this invention when dissolved in an aqueous medium.

In some of these examples, the initial viscosity, taken almost immediately after the gum is added to the water and/or the rate of viscosity build-up of the gum solution following addition of the gum, are used to show the rate of dispersion of the gum, since hydration of the gum does not occur until the particles are substantially dispersed throughout the liquid. In other examples, the time required to achieve a complete dispersion and/or the time to reach maximum viscosity are used as an indication of the rate of dispersion of the gum. Time zero in all examples in the time when the gums are first added to the aqueous solution, unless otherwise indicated. The viscosities of the solution are measured with a Gardner bubble viscometer, unless otherwise indicated.

These examples are merely illustrative and are not to be understood as limiting the scope and underlying principles of the invention in any way. All parts and percentages referred to herein are by weight, unless otherwise specifically indicated.

EXAMPLE 1

This example illustrates the preparation of a gum composition containing hydroxypropyl methylcellulose and dioctyl sodium sulfosuccinate. A 1% solution of dioctyl sodium sulfosuccinate in perchloroethylene is prepared and 10 ml. of the solution is added to 10 grams of hydroxypropyl methylcellulose. The mixture is slightly agitated to insure adequate wetting of the gum and the gum is then dried in a forced draft oven at 60° C. for 3 hours.

EXAMPLE 2

Two (2) aqueous solutions containing 2% hydroxypropyl methylcellulose, having a viscosity range of from 3500 to 5600 cps., are prepared. One solution contains a mixture of hydroxypropyl methylcellulose and 1% dioctyl sodium sulfosuccinate, prepared in the manner set forth in Example 1, and is designated solution A. The second solution contains hydroxypropyl methylcellulose only, and is designated solution B. Samples of the solutions are taken periodically and the viscosities of the solutions are determined. The results of the periodic viscosity determinations are set forth in Table 1.

TABLE 1

| Time (mins.) | Viscosity (cps.) | |
|---|---|---|
| | Solution A | Solution B |
| 0 | 800 | 60 |
| 10 | 1,100 | 100 |
| 30 | 1,300 | 400 |

The aforementioned procedures and solution designations are followed with the exception that 0.001% of dioctyl sodium sulfosuccinate is used and, lastly, the gum is changed to a hydroxypropyl methylcellulose, having a viscosity range of 350 to 550 cps. The results of the periodic viscosity determinations are set forth in Table 2.

TABLE 2

| Time (mins.) | Viscosity (cps.) | |
|---|---|---|
| | Solution A | Solution B |
| 0 | 50 | 50 |
| 10 | 65 | 60 |
| 20 | 94 | 75 |

EXAMPLE 3

The procedure of Example 2 is repeated using 2% hydroxypropyl methylcellulose (Methocel 65HG), having a viscosity of 400 cps., with varying amounts of dioctyl sodium sulfosuccinate (DSS), based on the weight of the gum. The gum compositions containing DSS are prepared in the manner set forth in Example 1.

A first control solution is prepared containing hydroxypropyl methylcellulose only, and a second control solution is also prepared in which the dioctyl sodium sulfosuccinate is added to the water prior to the addition of hydroxypropyl methylcellulose. The results of initial and final viscosity determinations of the solutions are set forth in Table 3 along with the time required to reach maximum viscosity.

TABLE 3

| Percent of DSS | Initial Viscosity (cps.) | Final Viscosity (cps.) | Time to Reach Maximum Viscosity (mins.) |
|---|---|---|---|
| 2.0 | 85 | 320 | 40 |
| 1.0 | 200 | 340 | 15 |
| 0.5 | 125 | 380 | 25 |
| 0.2 | 100 | 320 | 20 |
| 0.1 | 50 | 400 | 80 |
| 0.01 | 50 | 470 | 80 |
| 0.001 | 50 | 430 | 80 |
| 0.0 | 50 | 250 | 70 |
| *1.0 | 30 | 320 | 48 |

*1.0% DSS based on the weight of the gum in which the DSS is added to water prior to dissolution of the gum.

EXAMPLE 4

Three (3) aqueous solutions containing 2% hydroxypropyl methylcellulose, having a viscosity range of 350 to 550 cps., are prepared. The first solution contains a mixture of hydroxypropyl methylcellulose and 1% dioctyl sodium sulfosuccinate prepared in the manner set forth in Example 1, and is designated solution A. The second solution contains hydroxypropyl methylcellulose only, and is designated solution B.

A third solution is prepared containing, in addition to the hydroxypropyl methylcellulose, 1% w./v. dioctyl sodium sulfosuccinate, which is added to the water prior to the addition of the hydroxypropyl methylcellulose, and is designated solution C.

Samples of the solutions are taken periodically and the results of the periodic viscosity determinations are set forth in Table 4.

TABLE 4

| Time (mins.) | Viscosity (cps.) | | |
|---|---|---|---|
| | Solution A | Solution B | Solution C |
| 0 | 200 | 50 | 50 |
| 5 | 280 | 55 | 200 |
| 10 | 380 | 60 | 280 |

EXAMPLE 5

Two (2) aqueous solutions containing 2% hydroxyethylcellulose, having a viscosity range of 3500 to 5000 cps., are prepared. One solution contains a mixture of hydroxyethylcellulose and 1% dioctyl sodium sulfosuccinate prepared in the manner set forth in Example 1, and is designated solution A. The second solution, designated solution B, contains hydroxyethylcellulose and 1% dioctyl sodium sulfosuccinate; however, the dioctyl sodium sulfosuccinate is added to the water prior to the addition of the hydroxyethylcellulose.

Periodic viscosity determinations are taken, and the results of these determinations are set forth in Table 5.

TABLE 5

| Time (Mins.) | Viscosity (cps.) | |
|---|---|---|
| | Solution A | Solution B |
| 0 | 30 | 30 |
| 10 | 50 | 50 |
| 20 | 500 | 60 |
| 30 | 1,100 | 65 |

EXAMPLE 6

This example demonstrates the dispersion achieved by utilizing the process of this invention with water-soluble gum compositions. Results represent visual observations which are immediately apparent when the water-soluble gums are added to water. The mixtures of water-soluble gums and dioctyl sodium sulfosuccinate (DSS) are prepared in the manner set forth in Example 1.

TABLE 6

| Gum (Percent) | DSS (Percent) | Results |
| --- | --- | --- |
| Carboxymethylcellulose (1.0%). | 0.0 | Poor dispersion, agglomerate formation. |
| Do | 1.0 | Good dispersion, agglomerate formation substantially reduced. |
| Gum tragacanth (1.0%) | 0.0 | Poor dispersion, massive agglomerate formation. |
| Do | 1.0 | Good dispersion, agglomerate formation substantially reduced. |
| Gum karaya (0.5%) | 0.0 | Poor dispersion. |
| Do | 1.0 | Fair dispersion. |

EXAMPLE 7

The procedure of Example 2 is repeated using a 1% aqueous solution (solution A) of a mixture of 7HP, carboxymethylcellulose, and 0.4% dioctyl sodium sulfosuccinate (DSS). The second solution (solution B) contains 1% carboxymethylcellulose only.

Samples of the solutions are taken periodically during mixing of the gums in an aqueous solution. The approximate results of the periodic viscosity determinations are set forth in Table 7.

TABLE 7

| Time (Mins.) | Viscosity (cps.) | |
| --- | --- | --- |
| | Solution A | Solution B |
| 5 | 1,170 | 525 |
| 10 | 1,375 | 950 |
| 15 | 1,450 | 1,225 |
| 25 | 1,580 | 1,460 |
| 50 | ---------- | 1,540 |
| 75 | 1,900 | ---------- |

EXAMPLE 8

Three (3) aqueous solutions are prepared containing 0.5% of a mixture of carboxymethylcellulose (200 mesh) with varying amounts of dioctyl sodium sulfosuccinate (DSS), based on the weight of the gum. The mixtures of cellulose and sulfosuccinate are prepared in the manner set forth in Example 1. In addition, a control sample is prepared containing 0.5% carboxymethylcellulose only.

Two (2) grams of the gum in each sample are added to 400 ml. of water (25° C.) and a Lightnin mixer operating at 1000 r.p.m. is used to disperse the gums. The time required to effect a complete dispersion of the gum in the water is measured along with the build-up is viscosity following dispersion. The results of this example are set forth in Table 8.

TABLE 8

| Percent of DSS | Mixing Time for Dispersion (mins.) | Viscosity (cps.) at Various Hydration Times | | |
| --- | --- | --- | --- | --- |
| | | Initial* | 30 mins. | 22 hrs. |
| 0.2 | 20 | 304 | 324 | 304 |
| 0.4 | 24 | 330 | 330 | 310 |
| 0.5 | 26 | 324 | 316 | 300 |
| 0.0 | 52 | 316 | 304 | 290 |

*At end of mixing time.

EXAMPLE 9

The procedure of Example 2 is repeated using 2% aqueous solutions of methylcellulose and 0.99% dioctyl sodium sulfosuccinate (DSS), based on the weight of the gum. The solution containing a mixture of methylcellulose and the sulfosuccinate, which is prepared in the manner set forth in Example 1, is designated solution A. The second solution containing 2% methycellulose only, is designated solution B.

Samples of the solution are taken periodically during mixing of the gums in an aqueous solution and the approximate results of the periodic viscosity determinations are set forth in Table 9.

TABLE 9

| Time (Mins.) | Viscosity (cps.) | |
| --- | --- | --- |
| | Solution A | Solution B |
| 0 | 850 | 50 |
| 10 | 1,000 | ---------- |
| 15 | ---------- | 175 |
| 30 | 1,400 | 400 |
| 70 | ---------- | 1,400 |
| 85 | 1,800 | ---------- |
| 110 | 1,800 | 1,800 |

EXAMPLE 10

The procedure of Example 2 is repeated using 1% aqueous solutions of gum tragacanth, and 0.4% dioctyl sodium sulfosuccinate. The solution containing a mixture of the gum and sulfosuccinate, which is prepared in the manner set forth in Example 1, is designated solution A. The second solution containing the gum only is designated solution B.

Samples of the solutions are taken periodically during mixing of the gums in the aqueous solution and during hydration of the gums following mixing. The solutions are mixed for 35 minutes to effect a dispersion of the gum. The approximate results of the periodic viscosity determinations during dispersion and hydration of the gums are set forth in Table 10.

TABLE 10

| Time (Mins.) | Viscosity (cps.) | |
| --- | --- | --- |
| | Solution A | Solution B |
| 5 | 210 | 135 |
| 15 | 310 | 335 |
| 25 | 400 | 420 |
| 35 | ---------- | 430 |
| 50 | 500 | 440 |

EXAMPLE 11

The procedure of Example 10 is repeated using 1% karaya gum, and 0.4% dioctyl sodium sulfosuccinate.

Samples of the solutions are taken periodically during mixing of the gums in the aqueous solution and during hydration of the gums following mixing. The solutions are mixed for 15 minutes to effect a dispersion of the gum. The approximate results of the periodic viscosity determinations during dispersion and hydration of the gums are set forth in Table 11.

TABLE 11

| Time (Mins.) | Viscosity (cps.) | |
| --- | --- | --- |
| | Solution A | Solution B |
| 5 | 350 | 190 |
| 15 | 760 | 650 |
| 25 | 800 | 690 |
| 35 | 840 | 720 |

EXAMPLE 12

The procedure of Example 10 is repeated using 1% locust bean gum, and 0.4% dioctyl sodium sulfosuccinate.

The samples are mixed in an aqueous solution for 5 minutes to effect a dispersion, and samples of the solutions are then taken periodically following mixing. The approximate results of the periodic viscosity determinations during hydration of the gums following dispersion are set forth in Table 12.

TABLE 12

| Time (Mins.) | Viscosity (cps.) | |
| --- | --- | --- |
| | Solution A | Solution B |
| 5 | 35 | 30 |
| 15 | 80 | 60 |
| 25 | 115 | 95 |
| 35 | 137 | 112 |
| 60 | 180 | 140 |
| *22 | 330 | 275 |

*Hours.

EXAMPLE 13

Two (2) aqueous solutions containing 1.0% acacia (gum arabic) are prepared. One solution contains a mixture of the gum and 0.4% dioctyl sodium sulfosuccinate prepared in the manner set forth in Example 1. The second solution contains the gum only.

The solutions are prepared by adding four (4) grams of the gum or the mixture of gum and sulfosuccinate to 400 ml. of water at 25° C. in a Lightnin mixer operating at 1000 r.p.m. The time required to effect a complete dispersion of the gum in the water is visually observed.

The dioctyl sodium sulfosuccinate treated gum arabic composition dispersed in 147 seconds, whereas the solution containing gum arabic alone took 366 seconds.

EXAMPLE 14

Two (2) aqueous solutions containing 4% guar gum, Type GX, (100 mesh) are prepared. One solution contains a mixture of the guar gum and 0.4% dioctyl sodium sulfosuccinate, which is prepared in the manner set forth in Example 1, and is designated solution A. The second solution contains the guar gum only, and is designated solution B.

The solutions are prepared by adding eight (8) grams of the gum or the gum-DSS mixture to 200 ml. of water at 25° C. in a Lightnin mixer operating at 1000 r.p.m. The solutions are mixed for approximately one (1) minute to effect complete dispersion of the gum in the water.

Samples of the solutions are taken periodically following mixing, and the results of the periodic visiosity determinations during hydration of the gums following dispersion are set forth in Table 13.

TABLE 13

| Time (Mins.) | Viscosity [1] (cps.) Solution A | Solution B |
|---|---|---|
| 10 | 1,710 | 1,240 |
| 40 | 3,825 | 2,700 |
| 90 | 4,770 | 3,390 |
| [2] 24 | ........ | 4,500 |
| [2] 24 | [3] 6,180 | [3] 4,690 |

[1] Brookfield Synchro-Lectric RVF Viscometer, No. 3 spindle, 20 r.p.m.
[2] Hours.
[3] Brookfield Synchro-Lectric RVF Viscometer, No. 4 spindle, 20 r.p.m.

EXAMPLE 15

The procedure of Example 10 is repeated using 5% gum ghatti and 0.4% dioctyl sodium sulfosuccinate.

The gums are mixed in an aqueous solution for 25 minutes to effect a dispersion, and samples of the solutions are taken periodically during mixing and during hydration of the gums following mixing. The approximate results of the periodic viscosity determinations during dispersion and hydration of the gums are set forth in Table 14.

TABLE 14

| Time (Mins.) | Viscosity [1] (cps.) Solution A | Solution B |
|---|---|---|
| 5 | 115 | 65 |
| 15 | 180 | 106 |
| 25 | 205 | 108 |
| 60 | 205 | 110 |
| [2] 20 | 273 | 140 |

[1] Brookfield Synchro-Lectric RVF Viscometer, No. 1 spindle, 20 r.p.m.
[2] Hours.

EXAMPLE 16

Two (2) aqueous solutions are prepared containing 0.5% sodium alignate XRA-50 (200 mesh). One solution contains a mixture of sodium alignate and 0.4% dioctyl sodium sulfosuccinate prepared by the procedure set forth in Example 1. In addition, a second solution is prepared containing 0.5% sodium alginate only.

The gum samples are mixed in an aqueous solution to effect a dispersion of the gums. The time required to effect a complete dispersion of the gum is measured along with the build-up of viscosity during mixing and during hydration of the gums following mixing. The results of this example are set forth in Table 15.

TABLE 15

| Percent of DSS | Viscosity (cps.) at Various Times | | | | Mixing Time for Dispersion (mins.) |
|---|---|---|---|---|---|
| | 10 mins. | 30 mins. | 60 mins. | 72 hrs. | |
| 0.0 | 128 | 128 | 131 | 153 | 15 |
| 0.4 | 126 | 128 | 130 | 141 | 8 |

EXAMPLE 17

The procedure of Example 2 is repeated using a 2% aqueous solution of a standard ice cream stabilizer consisting of a mixture of guar gum, carboxymethylcelluose, carrageenan, and calcium sulfate. The solution containing a mixture of the gums and 0.4% dioctyl sodium sulfosuccinate is prepared by the procedure set forth in Example 1, and is designated solution A. A second solution containing 2% of the mixture of gums only is designated solution B.

Samples of the solutions are taken periodically during mixing of the gums in an aqueous solution and the approximate results of the periodic viscosity determinations are set forth in Table 16.

TABLE 16

| Time (mins.) | Viscosity (cps.) Solution A | Solution B |
|---|---|---|
| 10 | 2,250 | 250 |
| 20 | 3,850 | 2,650 |
| 30 | 4,400 | 3,850 |
| 40 | 4,750 | 3,950 |
| 45 | 4,850 | ........ |

EXAMPLE 18

The procedure of Example 17 is repeated using a 1% aqueous solution of the mixture of gums and calcium sulfate along with 0.4% dioctyl sodium sulfosuccinate. The results of this example are set forth in Table 17.

TABLE 17

| Time (Mins.) | Viscosity (cps.) Solution A | Solution B |
|---|---|---|
| 10 | 90 | 60 |
| 20 | 225 | ........ |
| 30 | 325 | ........ |
| 40 | 380 | 250 |
| 50 | 440 | 290 |
| 60 | 500 | 330 |
| 70 | ........ | 345 |
| 85 | ........ | 365 |
| 100 | ........ | 380 |
| 115 | ........ | 405 |
| 150 | ........ | 430 |
| 185 | ........ | 460 |

EXAMPLE 19

Three (3) samples, each containing 80 pounds of ice cream mix, are prepared in this example. Each sample of mix contains 0.12% of a water-soluble gum composition that is conventionally used as a stabilizer for the ice cream. One ice cream mix in each group contains a mixture of the gum and 0.5% of dioctyl sodium sulfosuccinate (DSS), based on the weight of the gum, and the mixture is prepared by the procedure set forth in Example 1. The second ice cream mix in each group contains only the gum.

Each ice cream mix is then run through the normal process for the production of ice cream, including pasteurization, homogenization, at 2500 p.s.i., and cooling in a cooling tower to remove heat from the mix. Following cooling, the viscosity of each mix is measured at 54° F. with a Brookfield viscometer, using a No. 1 spindle, operating at 12 r.p.m. The results of the viscosity measurements are set forth in Table 18.

quired to reach maximum viscosity. The results of these examples are reported in Table 19 below.

TABLE 19

| Ex. No. | Surface Active Agent | Initial Viscosity (cps.) | Final Viscosity (cps.) | Time to Reach Maximum Viscosity (mins.) |
|---|---|---|---|---|
| 3 | Dioctyl sodium sulfosuccinate | 200 | 340 | 15 |
| 20 | Diamyl sodium sulfosuccinate | 50 | 270 | 95 |
| 21 | Dihexyl sodium sulfosuccinate | 50 | 250 | 30 |
| 22 | Ditridecyl sodium sulfosuccinate | 50 | 400 | 120 |
| | Polyoxyethylene ethers of fatty alcohols: | | | |
| 23 | Brij 58 (Atlas Powder Co.) | 50 | 400 | 30 |
| 24 | Brij 52 (Atlas Powder Co.) | 50 | 320 | 65 |
| | Polyethyoxylated nonyl phenols: | | | |
| 25 | Surfonic N-95 (Jefferson Chemical Co.) | 50 | 360 | 40 |
| 26 | Surfonic N-150 (Jefferson Chemical Co.) | 50 | 400 | 45 |
| 27 | Surfonic N-20 (Jefferson Chemical Co.) | 50 | 360 | 120 |
| 28 | Polyoxyalkylene derivatives of propylene glycol: Pluronic L-6 (Wyandotte Chemical Co.) | 50 | 270 | 60 |
| 29 | Tris sulfonyl methane: Hexyl TSM (American Cyanamid Co.) | 50 | 320 | 40 |
| 30 | Alkyl benzene sulfonate: ABS (Atlantic Richfield Co.) | 50 | 400 | 100 |
| 31 | Sodium lauryl sulfonate Duponol C (E. I. du Pont Co.) | 50 | 300 | 60 |
| 32 | Sorbitan monopalmitate Span 40 (Atlas Powder Co.) | 50 | 370 | 80 |
| 33 | Polyoxyethylene monopalmitate Tween 40 (Atlas Powder Co.) | 50 | 320 | 95 |
| | Fatty acids: | | | |
| 34 | Lauric acid | 50 | 400 | 60 |
| 35 | Stearic acid | 50 | 430 | 80 |

TABLE 18

| Gum Composition | Percent DSS | Viscosity (cps.) |
|---|---|---|
| Guar | 0.5 | 46 |
| Do | 0.0 | 25 |
| Carboxymethylcellulose | 0.5 | 119 |
| Do | 0.0 | 38 |
| Carboxymethylcellulose (42.5%), guar (42.5%), and carrageenan (15.0%) | 0.5 | 338 |
| Do | 0.0 | 212 |

The ice cream mixes are then subjected to a conventional panel taste test. In this test, each sample is subjected to 1, 2, and 3 heat shocks, and then tested for its taste and its acceptability as an ice cream product.

A heat shock comprises removing the ice cream from storage and leaving it at room temperature for one-half hour and then refreezing the ice cream. The purpose of a heat shock is to permit any free water in the ice cream to form ice crystals as a result of melting and refreezing during the heat shock. Ice crystals tend to make the ice cream gritty, and the grittiness of the ice cream, therefore, is approximately inversely proportional to the hydration rate of the gum, since water of hydration will not form ice crystals during heat shocking.

The results of these tests generally show that ice cream mixes containing the gums alone are gritty or very gritty, even after only one heat shock. On the other hand, ice cream mixes containing dioctyl sodium sulfosuccinate treated gums vary from no grittiness to slight grittiness even after three heat shocks.

EXAMPLES 20-35

In Examples 20-35, aqueous solutions are prepared containing 2% hydroxypropyl methylcellulose (Methocel 65HG—viscosity of 400 cps.) and 1%, based on the weight of the gum, of a surface active agent. The mixture of gum and surface active agent is prepared in the manner set forth in Example 1.

Examples 20-35 are carried out to illustrate the superior performance achieved by using dioctyl sodium sulfosuccinate with the water-soluble gums of this invention.

The testing procedure of Example 3 is repeated in Examples 20-35 with the various surface active agents listed in Table 19. Initial and final viscosity measurements are made in each example, including the total time required to reach maximum viscosity. The results of these examples are reported in Table 19 below.

The invention in its broader aspects is not limited to the specific details shown and described, and departures may be made from such details within the reasonable spirit and scope of the accompanying claims without departing from the principles of the invention and without sacrificing its chief advantages.

What is claimed is:

1. A gum composition readily dispersible in water consisting essentially of a finely divided, water-soluble and edible gum selected from the group consisting of water-soluble and edible naturally-occurring vegetable gums and water-soluble and edible alkyl- and substituted alkyl-cellulose ethers, and from about 0.001 to 1.0% dioctyl sodium sulfosuccinate, based on the weight of the gum.

2. The composition of claim 1, in which the water-soluble gum is hydroxypropyl methylcellulose.

3. The composition of claim 1, in which the water-soluble gum is carboxymethylcellulose.

4. The composition of claim 1, in which the water-soluble gum is gum arabic.

5. The composition of claim 1, in which the dioctyl sodium sulfosuccinate is from about 0.2 to 0.5%, based on the weight of the gum.

6. The composition of claim 1, in which the water-soluble gum has a particle size between about 100 and 250 mesh.

7. A process for preparing a gum composition readily dispersible in water which comprises mixing a finely divided, water-soluble and edible gum selected from the group consisting of water-soluble and edible naturally-occurring vegetable gums and water-soluble and edible alkyl- and substituted alkyl-cellulose ethers with from about 0.001 to 1.0% dioctyl sodium sulfosuccinate, based on the weight of the gum, dissolved in a non-aqueous solvent, and drying the mixture to evaporate the solvent.

8. The process of claim 7, in which the water-soluble gum is hydroxypropyl methylcellulose.

9. The process of claim 7, in which the water-soluble gum is carboxymethylcellulose.

10. The process of claim 7, in which the water-soluble gum is gum arabic.

11. The process of claim 7, in which the dioctyl sodium sulfosuccinate is from about 0.2 to 0.5%, based on the weight of the gum.

12. The process of claim 7, in which the non-aqueous solvent is perchloroethylene.

13. The process of claim 7, in which the water-soluble gum has a particle size between about 100 and 250 mesh.

References Cited

UNITED STATES PATENTS

| | | | |
|---|---|---|---|
| 2,028,091 | 1/1936 | Jaeger | 260—106 |
| 2,716,072 | 8/1955 | Hanson | 106—186 |
| 3,370,956 | 2/1968 | Reitman | 99—78 |
| 3,376,285 | 4/1968 | Callihan et al. | 260—232 |

OTHER REFERENCES

Arthur and Elizabeth Rose, The Condensed Chemical Dictionary, 6th ed., 1956, p. 865.

LEON D. ROSDOL, Primary Examiner

DENNIS L. ALBRECHT, Assistant Examiner

U.S. Cl. X.R.

99—131; 106—181, 208